United States Patent [19]

Hu

[11] Patent Number: 5,297,040
[45] Date of Patent: Mar. 22, 1994

[54] MOLECULAR NATURAL LANGUAGE PROCESSING SYSTEM

[75] Inventor: Franklin T. Hu, 2813 Whitworth Ave., S., Renton, Wash. 98055

[73] Assignee: Franklin T. Hu

[21] Appl. No.: 781,761

[22] Filed: Oct. 23, 1991

[51] Int. Cl.⁵ .......................................... G06F 15/21
[52] U.S. Cl. ................................................ 364/419.08
[58] Field of Search ........... 364/419.1, 419.02, 419.04, 364/419.08, 419

[56] References Cited

U.S. PATENT DOCUMENTS

| | | | |
|---|---|---|---|
| 4,706,212 | 11/1987 | Toma | 364/419.02 |
| 4,864,501 | 9/1989 | Kucera et al. | 364/419.08 |
| 4,868,750 | 9/1989 | Kucera et al. | 364/419.08 |
| 4,931,935 | 6/1990 | Ohira et al. | 364/419 |
| 4,994,966 | 2/1991 | Hutchins | 364/419 |
| 5,083,268 | 1/1992 | Hemphill et al. | 364/419 |
| 5,101,349 | 3/1992 | Tokuums et al. | 364/419 |
| 5,151,857 | 9/1992 | Matsui | 364/419 |
| 5,197,005 | 3/1993 | Shwartz et al. | 364/419 |
| 5,224,038 | 6/1993 | Bespalko | 364/419 |

*Primary Examiner*—Donald E. McElheny, Jr.

[57] ABSTRACT

A natural language processing system for processing digitally encoded text by utilizing a "molecular" method. This method combines words into sentences like atoms combine to form molecules. Each word in the language is treated like an atom which has particular attributes and binding characteristics. By verifying if these binding characteristics have been satisfied, it can be determined if a set of words can follow each other to form sentences of the language.

8 Claims, 4 Drawing Sheets

MOLECULAR NATURAL LANGUAGE PROCESSING SYSTEM

RELATED INSTRUMENT

A description of this invention was filed with U.S. Patent Office on Nov. 5, 1990, under Disclosure Document No. 266,308.

BACKGROUND—FIELD OF INVENTION

This invention relates to a language processing system, and more particularly to a natural language processing system where the syntactic and semantic requirements for each word in the language are specified in a dictionary and processing is done to verify these requirements.

BACKGROUND—DESCRIPTION OF PRIOR ART

An essential element of any natural language processing system is a parser which can identify the parts-of-speech and phrase boundaries in a sentence. There have been many attempts to create a parser which can process natural language sentences with an unrestricted grammar and vocabulary. However, a finding a satisfactory solution to this problem has proven difficult. A survey of some natural language systems appears in the textbook of Winston, *Artificial Intelligence* at pages 291-313. Natural language researchers have noted that conventional parsing approaches cannot adequately capture the sentence varieties found in natural languages without becoming unacceptably large and complex. All natural language processing systems heretofore known suffer from a number of disadvantages.

(a) Their construction relies on encoding the syntax of the language in a single data which encodes all possible combinations of word order for a well-formed sentence. The data table is commonly referred to as a parse table. Because the number of possible combinations grows exponentially with the number of words in a sentence, the size and complexity of the phase table also grows exponentially.

(b) This explosive growth places a practical limit on the vocabulary and syntactic variety a natural language processor can handle. Usually, this limit is far below what would be required for a general purpose natural language processor.

(c) Many existing systems can only be used to handle limited language domains. An example of such a system would be a language system which can only handle questions which are about airline reservations.

(d) Even if the language domain is restricted to a narrow vocabulary and grammar, these systems are too large and slow to be practical for most personal computing systems.

(e) Existing language systems which do handle an unrestricted vocabulary and grammar do not provide a reliable or complete analysis. These language systems typically process a sentence by (1) assigning the parts-of-speech to each word in the sentence by using a probabilistic analysis. (2) examining these parts-of-speech tags to determine the phase and sentence structure. The parts-of-speech tags and phrase structures can then be used to determine if an ungrammatical construction exists in the sentence. Because the parts-of-speech information alone does not indicate how words must combine to form a grammatical sentence, these systems generally cannot detect serious sentence structure errors. This limitation can be demonstrated in commercially available grammar checking products which use this approach. For example, Grammatik IV Version 1.0 can Correct Grammar Version 3.0 fail to detect anything wrong with the following mixed up sentence.

"To the get some to walked bread I store."

These grammar checkers failed to notice anything wrong with this sentence because they cannot adequately determine what constitutes a grammatical sequence of words. Correct Grammar uses U.S. Pat. No. 4,864,502 of Henry Kucera filed Sep. 5, 1989.

(f) Since existing language processing systems are not sufficiently accurate, they cannot be used to create a comprehensive grammar checking device.

(g) The parse tables needed by existing natural language systems are difficult to build and diagnose. Since all of the grammar rules are encoded in a single table, it is difficult to predict the effect of adding a rule to this table. If a new rule is added or an existing rule modified, it could adversely affect every other rule in the table. The parse table can be "broken" very easily.

(h) Once a parse table has become "broken", it is difficult to diagnose the cause. This is become the grammar rules that a person creates for a language system are compiled into a form which is not human readable. They are typically compiled into an efficient finite state automata (FSA). This FSA is then manipulated by a computer in a manner which is far removed from the original grammar rules. This makes it almost impossible to diagnose the effect of individual grammar rules.

(i) Existing language systems must use a multi-step process to do semantic analysis. Usually the syntax of the sentence is established, then another step is required to analyze the syntax information to derive the semantic information. Such semantic information would be needed to determine if the subject and verb of a sentence agree in person and number. U.S. Pat. No. 4,914,590 of Loatman et al. filed Apr. 3, 1990 discloses a natural language systems which uses a multi-step process to do semantic analysis.

(j) Existing language systems cannot handle words which are not defined. These systems rely on the semantic and syntactic information contained in a dictionary. Without this dictionary information, it is impossible to parse the sentence.

(k) Due to the ambiguity contained in a natural language, existing languages systems have difficulty in keeping track of ambiguous sentence constructs. They also have difficulty in backtracking to ambiguous points in the sentence.

(l) Existing language systems lack the ability to predict the next word in a sentence based upon the words which have been seen so far. Such an ability to predict the next word would be helpful in determining the definition of an unknown word. It would also be useful for speech recognition and spell checking devices because it would narrow down the possible candidates for the next word.

(m) Existing language systems require that the grammar rules be processed into a parse table. This processing step takes a significant amount of time and it slows down the development of a natural language grammar.

(n) Existing language systems express their grammar rules in a restrictive manner. Each rule can only express a small fragment of the language syntax. Consequently, an excessive number of rules are required to express the complete syntax of a language.

OBJECTS AND ADVANTAGES

Accordingly, several objects and advantages of the present invention are:
 (a) To provide a natural language processing system which eliminates the need to encode grammar rules into a single parse table.
 (b) To provide a natural language processing system which can accommodate an arbitrary number of grammar rules without becoming excessively complex.
 (c) To provide a natural language processing system which can accommodate an unrestricted vocabulary and grammar.
 (d) To provide a natural language processing system which can be easily implemented on personal computing systems.
 (e) To provide a natural language processing system which can precisely identify the parts-of-speech, phases and word order for a grammatical sentence.
 (f) To provide a natural language processing system which will provide an improved device for the grammatical analysis of natural language text.
 (g) To provide a natural language processing system which can be easily modified and maintained.
 (h) To provide a natural language processing system which can be easily diagnosed if problems occur.
 To provide a natural language processing system which will provide an improved device for the semantic analysis of natural language text in a single step process.
 (j) To provide a natural language processing system which can handle undefined words in the language.
 (k) To provide a natural language processing system which will provide and improve method for resolving ambiguity and backtracking.
 (l) To provide a natural language processing system which will allow the prediction of the next word based upon the words seen in the sentence so far.
 (m) To provide a natural language processing system which does not require the grammar rules to be processed in any manner before a sentence can be parsed.
 (n) To provide a natural language processing system which provides an improved method to express the grammar rules of a language in a compact and easy to understand fashion.
 Further objects and advantages are to provide general purpose language processing system which can be extended to any natural or computer (e.g. PASCAL, COBOL, etc.) language for any use including (but not limited to) grammar/spell checking, speech recognition, data storage and retrieval, speech and text production, and cognition. Still further objects and advantages will become apparent from a consideration of the ensuring description and drawings.

DESCRIPTION OF THE PREFERRED EMBODIMENTS

The molecular language processing method is based on the idea that each word in a language is like an atom. Like atoms can join together to form molecules, words can be join together to form sentences. Each word has particular attributes and binding characteristics. These binding characteristics determine if a set of words can attach to each other to form a complete sentence. The molecular language processing system parses a sentence by determining if the binding characteristics of each word in a sentence are satisfied. This is done by examining a word in the sentence and checking if the next word in the sentence can bind to it. A general purpose computer or specialized computing hardware is used to process digitally encoded natural language text and a dictionary file is used to store each word in the language and its binding characteristics. The molecular language processing method can be demonstrated by examining the words in the sentence:

"The boy ate food."

First, examine the word "the ". This word is an article which specifies that a particular object is being mentioned. This word cannot stand as a sentence. For example:

"The."

would not be considered a complete sentence. The nature of the word "the" requires that some kind of object is logically required. This requirement is satisfied by the next word in the sentence which is "boy". The sequence of words:

"The boy."

is still not a complete sentence. However, this completes a phrase structure since everything that the word "the" required was satisfied and the word "boy" doesn't need anything more to be logically complete. This phrase structure is commonly referred to as a noun phrase. The reason why a noun phrase cannot form a complete sentence is because sentences usually relate an object to an action. Therefore, the noun phrase logically requires some kind of action. This action is satisfied by the word "ate". This forms the sequence of words:

"The boy ate."

The word "ate" does not logically require anything, so the requirements of all the words are satisfied and a complete sentence is formed. However there is still another word to be considered in the sentence which is "food". The word "ate" can stand alone as an action but this action infers that there is something which is receiving this action. Therefore an object can be optionally associated with the word "ate". The object which is receiving the action is the word "food". This completes the processing of the sentence: "The boy ate food."

All the requirements of the words are satisfied and all of the words can be associated with each other. It can be seen from this example that there can be two kinds of word bindings.

1. The word or phrase is absolutely required. For example, the word "the" must have an object and a noun phrase must have an action.
 2. The word or phrase can be associated with the word, but is optional. For example, the word "ate" can be optionally associated with an object.

Figure 1:
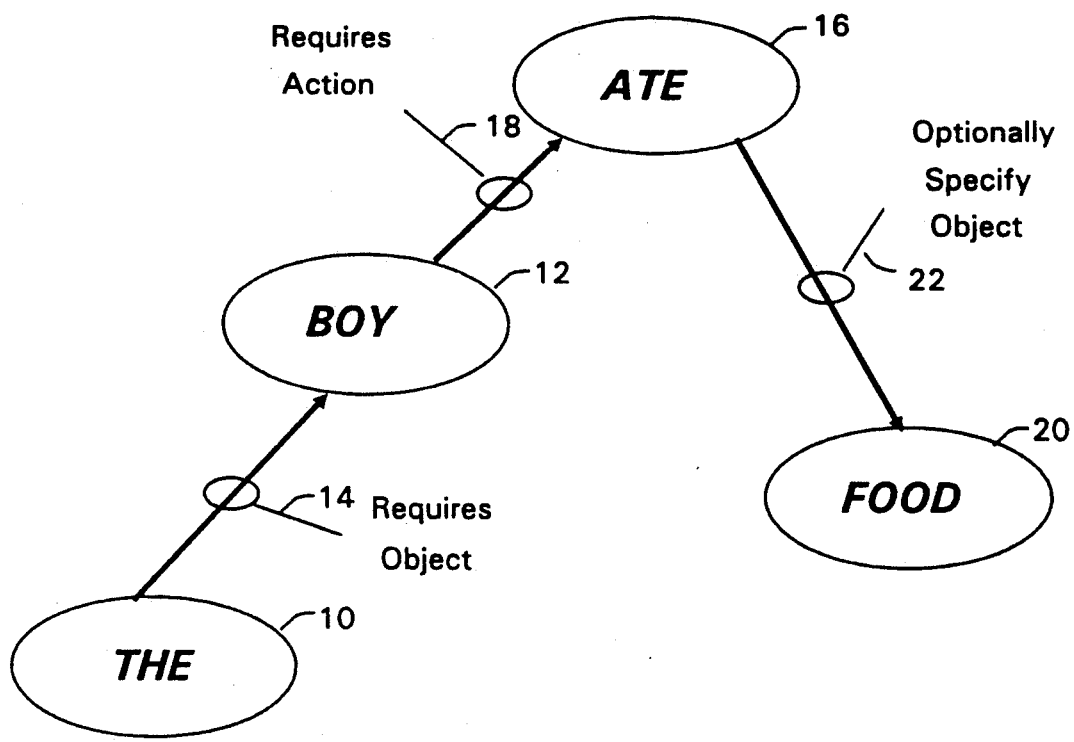
FIG. 1 shows a network diagram of how word requirements are related in a sentence.

These bindings form the basic "molecular requirements" of a word. Any information which restricts the kinds of words which can be associated with a word is also part of the molecular requirements for a word. This information can be syntactic or semantic. Syntactic information specifies the order in which words must appear. The syntactic information also determines the kinds of words and phrases which can immediately follow a word. A graph of the words and how the molecular requirements are satisfied is shown in FIG. 1. For example, the word "food" 20 must appear after the word "ate" 16. Semantic requirements specify what can be logically associated with a word. The nature of the word "ate" logically specifies that there is an object to be eaten. The word "THE" 10 is bound to the word "BOY" 12 through the "requires object" binding 14. The word "BOY" 12 is then bound to the word "ATE" 16 through the "requires action" binding 18. Finally, the word "FOOD" 20 is bound to the word "ATE" 16 through an "optionally specify object" binding 22. Thus, by examining each word and its molecular requirements, the molecular natural language processing system verifies that molecular requirements for each word in the sentence are satisfied.

The structure in FIG. 1 looks somewhat like a diagram of atoms attached together into a molecule. This structure also represents a useful semantic representation of the sentence. The bindings and the words form a semantic network. This network shows how each word in the sentence is related to each other. The bindings indicate what role each word in the sequence plays. For example, the bindings indicate what is the action taking place and what is the object of the action. A discussion of semantic networks can be found in the textbook of Winston, *Artificial Intelligence* at pages 314–325.

The process of verifying the molecular requirements of each word in a sentence forms a basic implementation of the molecular language processing system. However, there can be many other example embodiments of the invention.

EXAMPLE EMBODIMENT OF INVENTION

Figure 2:
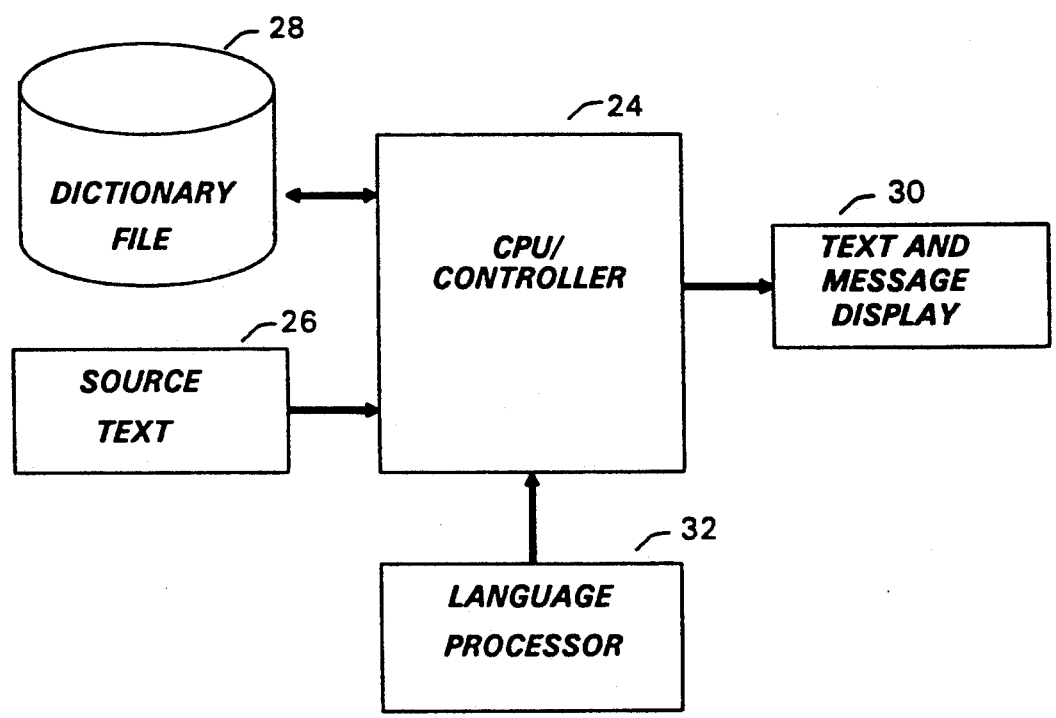
FIG. 2 shows a block diagram of one embodiment of the natural language processing apparatus of the present invention.

FIG. 2 shows a block diagram of one possible embodiment of the natural language processing apparatus of the present invention. Determining if a sentence is well-formed (grammatical) will be considered here. The language processing apparatus consists of a CPU/Controller 24 which may, for example, be a general purpose computer or specialized computing hardware. The CPU/Controller 24 receives input text 26, e.g., from keyboard entry, a communications link, or a data storage device. This input text may be further divided into words and sentences. The controller 24 then passes the input text to a language processor 32 which processes the input text to determine if it has received a grammatical sequence of words. Parse results, error messages or "prompts" are displayed on display 30.

Figure 3:
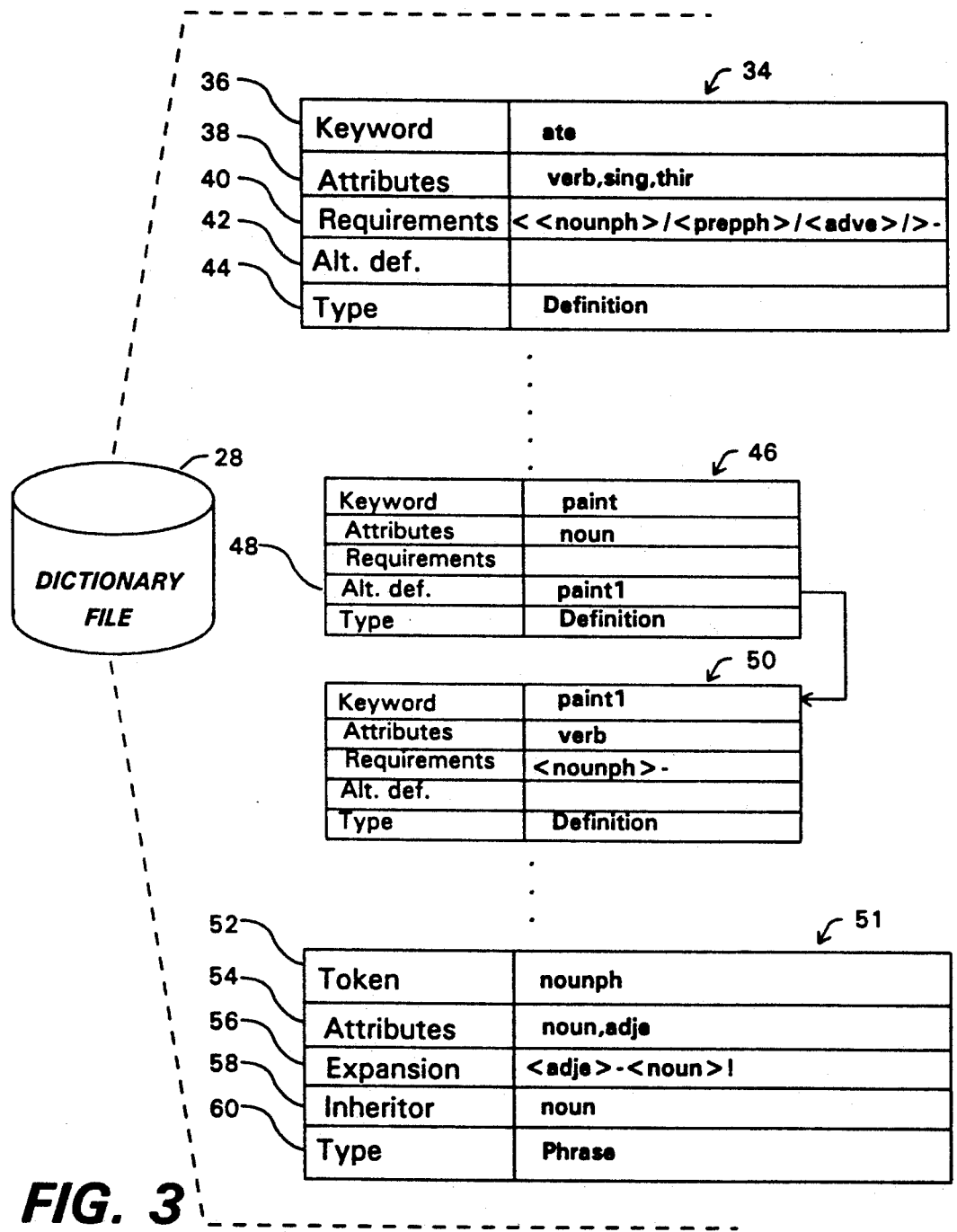
FIG. 3 shows the data contained in the dictionary file.

The dictionary 28 includes a record for each word of the language. FIG. 3 shows the dictionary file and some sample records contained in the dictionary. In one particular embodiment of the present invention, the record for each word definition 34 contains five fields. These fields are:

1. Keyword (36)

This field contains the character string representation of the word to be defined. For example, "apple", "car", and "run" could be keyword entries.

2. Attributes (38)

This field describes the syntactic and semantic properties of the word in the record. Such attributes might include if a word is singular, plural, or first/second/third person. These attributes could be represented by a four letter mnemonic. Such a mnemonic representation is listed in the following table:

| mnemonic | Description | Example word |
|---|---|---|
| noun | Is a noun | thing |
| verb | Is a verb | ran |
| adje | Is an adjective | blue |
| adve | Is an adverb | quickly |
| sing | Is singluar | car |
| plur | Is plural | cars |
| thir | Is third person | they |
| firs | Is first person | I |
| seco | Is second person | you |
| subj | Is subjective form | he |
| obje | Is objective form | him |

These attributes can be combined by separating them with commas on a single line. For example, the word "boat" could have an attribute field of:

noun,sing,thir

This would imply that the word "boat" is a noun and that it is singular and third person.

3. Molecular Requirements (40)

This unique field indicates what kinds of words and phrases must follow or can be associated with the word in the definition. For example, the word "ate" can typically only be followed by a noun phrase, a prepositional phrase, an adverb, or nothing. Examples of these word usages are:

I ate the cake.
I ate in the car.
I ate quickly.
I ate.

This just about exhausts the possibilities for the kinds of words that can directly follow the word "ate". Similarly, the word "put" is typically followed by a noun phrase followed by a prepositional phrase.

A suitable syntax is used to express the molecular requirements. One possible embodiment of this syntax is:

< > —angle brackets enclose word and phrase tokens
/ —backslash indicates a list of tokens
! —exclamation indicates required tokens
— —dash represents optional tokens
, —commas represent attributes attached to tokens The angle brackets are used to surround the tokens of the syntax. The symbols slash "/", exclamation "!", and dash "—" represent optionality flags. These indicate if a token is optional or not. For example, the molecular requirements for the word "ate" can be expressed.

<<nounph>/<prepph>/<adve>/>—

The symbols "nounph", "prepph", and "adve" are tokens of the syntax. "nounph" and "prepph" are phrase tokens since they represent groups of words and "adve" is a word token since it only represents a single word. Each of these tokens is surrounded by angle brackets to identify them as tokens. The slash "/" indicates that the word "ate" can be followed by either a <nounph> or a <prepph> or an <adve>. The slash allows a list of molecular requirements to be created.

The surrounding angle brackets and the optionality flag "—" indicate that none of these tokens are required.

The phrase structure tokens <nounph> and <verbph> express the high-level relationship between groups of words. For example, the phrase structure rules for <nounph> and <verbph> could be:

<nounph> → <adje>—<noun>!
<prepph> → <prep>!<nounph>!

The <nounph> phrase structure rule states that a <nounph> consists of an optional adjective followed by a mandatory noun. This was accomplished by placing a dash "—" after <adje> and an exclamation mark "!" after <noun>. The <prepph> rule states that a <prepph> must consist of a preposition followed by a noun phrase. The right hand side of this phrase structure rule is known as the expansion of the phase rule. These phrase structure rules only act as a shorthand. By expanding the rules for <nounph> and <prepph>, the molecular requirements for the word "ate" could be equivalently expressed as:

<<<adje>—<noun>!>/<<prep>!<<adje>—<noun>!>!>/<adve>/>—

This is much more difficult to comprehend, so phrase structure rules provide a useful shorthand for expressing molecular requirements. The phrase structure rules also provide a way of specifying the semantic and syntactic requirements for phrases. The semantic requirements are specified by the tokens and optionality flags contained in their expansions. The syntactic requirements are specified by the specific ordering of the tokens within the expansions. For example, within a "nounph", the <adje> must come before the <noun>. The most basic phrase structure rule specifies the requirements for a complete sentence. A sentence requires an object and an action. This can be expressed as:

<sentence>→<nounph>!<verbph>!

Another example of a molecular requirement can be examined for the word "put". The nature of the word "put" indicates that there needs to be an object and a place to put it. Therefore, a <nounph> and <prepph> are semantically required. In English, the <nounph> syntactically comes before <prepph>. Thus, the molecular requirement for the word "put" could be expressed:

<nounph>!<prepph>!

This compactly expresses the semantic and syntactic molecular requirements for the word "put. If the prepositional phrase were optional, the molecular requirement could be expressed as:

<nounph>!<prepph>—

The syntax can become more specific by attaching attributes onto the tokens inside of the angle brackets. For example, to express that a singular, third person noun is required, this can be done by:

<noun,sing,thir>!

A comma after the token indicates attributes that the token must have in order to match.

This syntax is very flexible and can express most any molecular requirement in a compact and easy to understand fashion. It specifies both the syntactic and semantic molecular requirements for each word. The same syntax can also be used to express the syntactic and semantic requirements of phrase structure rules. This syntax description contains many specificities, however, there can be many other possible additions and embodiments of this syntax.

4. Alternate definition (42)

Since many words have more than one meaning, this field is used to point to the next possible usage of a word. For example, the word "paint" can be a noun as in "The paint is green." or it can be a verb as in "I will paint the fence." The molecular requirements for each of these usages are different, therefore two dictionary entries are required. The record for the noun use of the word "paint" 46 can be entered into the dictionary as "paint". The alternate definition field of the definition for "paint" 48 will contain a unique keyword/pointer for the verb definition of "paint". Such a unique keyword can be created by appending numbers onto the end of the word. For example, "paint1" can represent the verb form of the word "paint". Another dictionary entry 50 would be created for "paint1" as a verb. Thus, a chain of alternate definitions can be created for each word as shown by the record for "paint" 46 pointing to the record for "paint1" 50 in FIG. 3.

5. Phrase structure rule or word definition flag (44)

The preferred embodiment of the present invention allows both phrase structure rules and word definitions to be stored in exactly the same data structure. This allows phrase structure rules to be stored in the same dictionary database as regular word definition entries. This field indicates if the record is a definition or if it is a structure rule. For words, the type flag 44 indicates that the record is a word definition. The fields are described as above.

If this flag is set to indicate that the record is a phrase structure rule 60, then the fields are redefined as shown in record 51.

1. Token field (52)

Instead of a word of the language, this will contain the token used to represent the phrase structure. Such tokens might be "nounph" and "verbph".

2. Attributes field (54)

Instead of containing the attributes of a word, this field contains the attributes of the kind of words that can start the phrase structure. For example, a <nounph> can only be started with an <adje> or a <noun>. Therefore, its attributes field will contain: adje,noun This means that a <nounph> can only be started with an adjective or a noun.

3. Expansion field (56)

Instead of a word's requirements, this field contains the expanded phrase structure rule for the phrase. For example, the expansion field for <nounph> would contain:
<adje>—<noun>!

4. Inheritor field (58)

Phrase structure rules can also have attributes appended onto them. For example, a singular noun phrase could be expressed as:
<nounph,sing>

When the <nounph> is expanded, the attribute "sing" needs to be assigned to a part of the phrase rule expansion. Otherwise, it would be lost. For <nounph>, the inheritor of the attribute should be the <noun>. Therefore, the token <noun> is placed in the inheritor field. The completed expansion for <nounph,sing> would be:

<adje>—<noun,sing>!

Parsing of a Sentence

Figure 4:
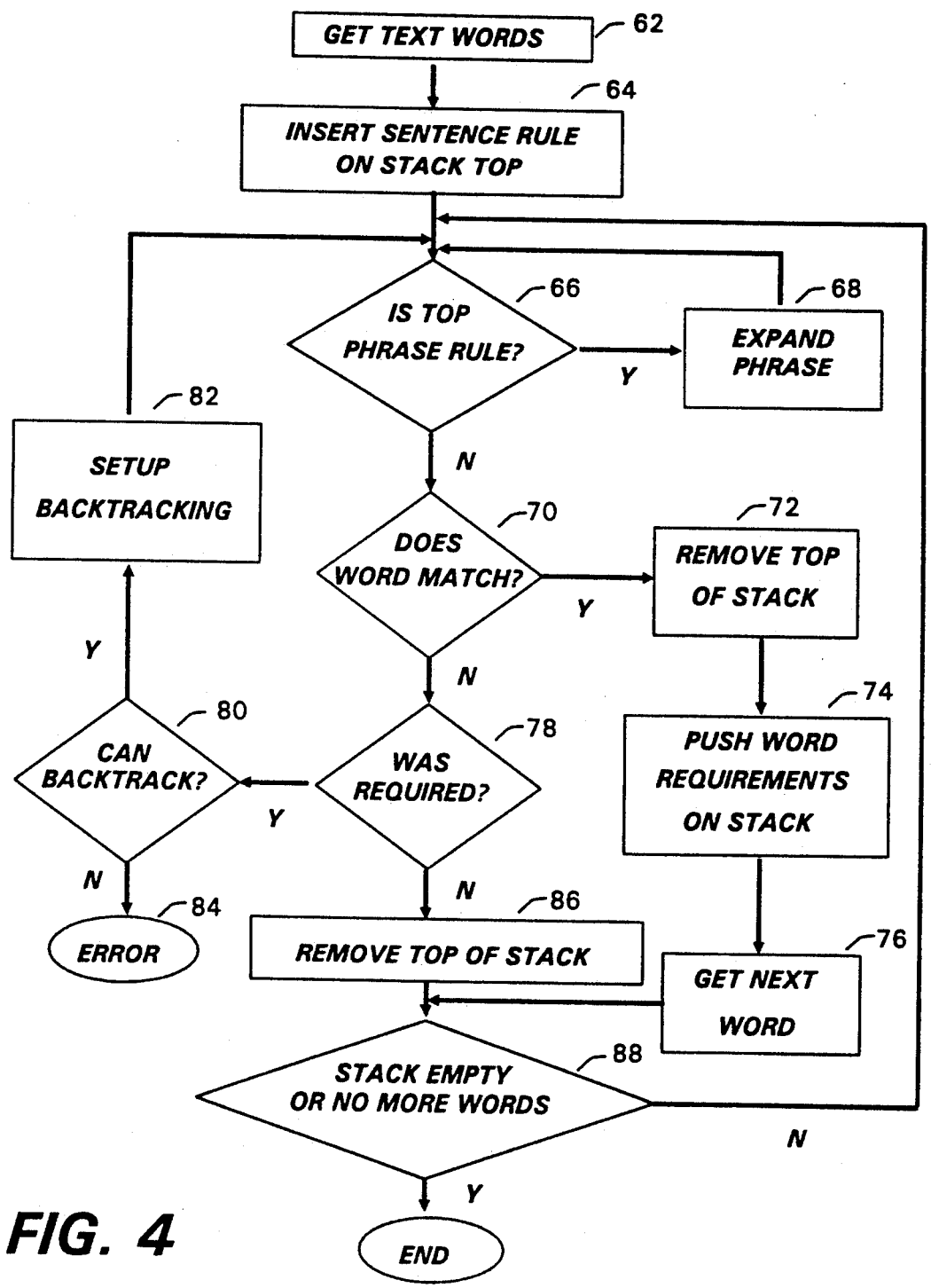
FIG. 4 shows a flow chart of an operation in one embodiment of the present invention.

FIG. 4 shows a flow chart of the processing process used in the present embodiment. The operation is explained with reference to FIG. 4. To demonstrate the operation of the parser, The sentence "The boy ate food." will be considered. Before processing can begin, the input text is broken into words which can be sequentially analyzed (step 62). The processor uses a First-in Last-out (FILO) stack structure. This structure is similar to a stack of dishes where you remove and add dishes to the top of the stack. The first item placed on this stack is the phrase structure rule for a sentence (step 64). The contents of the stack at this point can be represented as:

<sentence>!

The stack is then checked to see if the top of the stack contains a phrase structure rule (step 66). This is done by getting the record for the token "sentence" in the dictionary 28 and examining the type field. The record for "sentence" could contain:

| Token | sentence |
|---|---|
| Attributes | noun,adje |
| Expansion | <nounph>!<verbph>! |
| Inheritor | |
| Type | Phrase |

Since the token "sentence" is a phrase structure rule, the phrase is expanded (step 68). To do this the phrase rule token is first removed from the stack. The stack will then contain:

<>!

The phrase structure rule in the Expansion field is then inserted so that the stack will contain:

<<nounph>!<verbph>!>!

Steps 66 and 68 are repeated since <nounph> is a phrase expansion rule. After "nounph" has been expanded, the result is:

<<<adje>-<noun>!>!<verbph>!>!

The top of stack contains <adje> which is not a phrase structure rule. <adje> is a token which represents a word. Step 70 checks if a word in the sentence matches the top of the stack. The first word in the example sentence is "the". The word is looked up in the dictionary 26 and the Attributes are compared to the attributes of <adje>. The record for the word "the" could be:

| Keyword | the |
|---|---|
| Attributes | adje |
| Requirements | |
| Alt. Def. | |
| Type | Definition |

The attributes for <adje> and "the" match, so a word match is found. Once a match has been found, the top of the stack is removed (step 72). In step 74, the word "the" is checked to determine if the word has any molecular requirements. The molecular requirements for the word "the" have already been expressed by the <nounph> phrase rule. There are no other molecular requirements, so no action is taken. The stack will then contain:

<<<noun>!>!<verbph>!>!

Step 76 then gets the next word in the sentence which is "boy". Step 88 returns control to step 66 if there are more words to be processed. The word "boy" is matched up with <noun> in a manner similar to the way "the" was matched with <adje>. The definition for the word "boy" could contain:

| Keyword | boy |
|---|---|
| Attributes | noun,sing,thir |
| Requirements | |
| Alt. Def. | |
| Type | Definition |

The top of the stack is removed in step 72 and the stack will then contain:

<<verbph>!>!

The word "boy" does not have any specific molecular requirements, however, the word "boy" will require that the next verb in the sentence must match in person and number to the word "boy". This is an agreement among clauses rule in English. To enforce this agreement rule, the attributes which need to match are transferred into the stack structure. The attributes of person and number for the word "boy" can be transferred to the nearest <verbph> in step 74. The stack will then contain:

<<verbph,sing,thir>!>!

Steps 66 and 68 will expand the phrase rule <verbph>. The stack will then contain:

<<<adve>-<verb>!>!>!

The <verbph> also had the attributes of "sing,thir" attached to it. The record for the taken "verbph" could be:

| Token | verbph |
|---|---|
| Attributes | adve,verb |
| Expansion | <adve>-<verb>! |
| Inheritor | verb |
| Type | Phrase |

The Inheritor field indicates that the attributes should be transferred to the <verb>. The stack will then contain:

<<<adve>1<verb,sing,thir>!>!>!

At this point, step 70 will check if the word "ate" matches <adve>. The record for the word "ate" could contain:

| Keyword | ate |
|---|---|
| Attributes | verb,sing,thir |
| Requirements | <<nounph>/<prepph>/<adve>/>- |
| Alt. Def. | |
| Type | Definition |

The attributes of "ate" do not match <adve>. Step 78 then checks if the item at the top of the stack was a required item. This is accomplished by examining the optionality flag of the top of the stack. In this case, the flag is a dash. This indicates that the <adve> was optional. If the optionality flag on <adve> was exclamation mark "!", this would indicate that the <adve> was mandatory and step 80 would determine whether to signal a syntax error in step 84 or to backtrack in step 82. If a syntax error is detected, analysis of the stack can be used to report an error indicative of the syntax error. Backtracking can be done if the parser accepted an ambiguous word. Ambiguous words are usually words which have an alternate definition. Step 82 sets up backtracking by going back to the ambiguous word and restoring the state of the stack to when the ambiguous word was accepted.

Since <adve> was not mandatory, processing continues at step 86 which removes <adve>- from the top of the stack. The state of the stack will then be:

<<verb,sing,thir>!>!

Step 70 will find that the word "ate" does match with the attributes of "verb,sing,thir". Step 72 will remove the top of the stack. The stack will contain:

<>!

Step 74 will check if "ate" has any molecular requirements. The word "ate" does have a molecular requirement. This requirement is pushed onto the top of the stack. Step 76 will then get the next word "food". The stack will then contain:

<<<<prepph>/<nounph>/<adve>/>->!>!

Step 66 will check if <prepph> is a phrase structure rule. The record for <prepph> could contain:

| Token | prepph |
|---|---|
| Attributes | prep |
| Expansion | <prep>!<nounph>! |
| Inheritor | |
| Type | Phrase |

Step 66 can immediately expand the phrase in step 68, but it can take a shortcut by checking if the word which is currently being examined "food" can start the phrase rule. The record for the word "food" could contain:

| Keyword | food |
|---|---|
| Attributes | noun,sing,thir |
| Requirements | |
| Alt. Def. | |
| Type | Definition |

The attributes field in the record for the token "prepph" indicates that only a preposition can start a "prepph". Since the noun "food" cannot start prepph, there is no reason to expand prepph. Instead, the parser can assume that no match was found for prepph. The parser can then skip to step 78 which will examine if the phase was required.

The optionality flag on <prepph> is the slash. This indicates that <prepph> is one of many possibilities. Since it is not required, the top of the stack is removed in step 86. This stack will then look like:

<<<<nounph>/<adve>/>->!>!

Steps 66 and 68 will expand <nounph> and will result in:

<<<<adje>-<noun>!>/<adve>/>->!>!

The top of the stack <adje> doesn't match "food" and the top of the stack is removed. The stack will then contain:

<<<<noun>!>/<adve>/>->!>!

The word "food" will match the top of the stack and step 86 will remove the top of the stack. This will leave:

<<<>/<adve>/>->!>!

Since one of the tokens separated by slashes was found, there is no need to examine any of the other tokens delimited by the slashes. The parser only needs to find one of the tokens delimited by the slashes. Therefore, all of the tokens delimited by slashes can be removed in step 72 when the top of the stack is removed. The stack will then contain:

<<<>->!>!

Step 88 determines that there are no more tokens left on the stack and that there are no more words to be processed. The parsing process then ends in a successful parse of the sentence "The boy ate food."

There can be many possible embodiments of the molecular language processing system. The above embodiment is optimized for parsing natural languages like English which have a very strict syntax structure. English always places the subject first, the verb second and the object third. However in many other languages such as Korean and Russian, the subject, verb and object can appear in any order. To support these languages, the molecular requirements would still be specified for each word, but the requirements would not specify any specific order for the items in the requirement. This could be accomplished by adding an additional symbol to the molecular requirement syntax. Such a symbol could be an asterisk "*" which would indicate that the item can appear in any order in the sentence. The phrase structure rule for a sentence could be expressed as:

<<verbph>!>*<<nounph, subj>!->*<<nounph, obje>!>*>!

This rule would assure that the sentence contained a subjective noun phrase, an objective noun phrase and a verb phrase. Instead of always looking at the top of the stack for the next kind of word that is expected, the parser would examine each of phrases marked by the asterisk and phrases could be expanded from the middle or the end of the stack.

From the description above, a number of advantages of the molecular language processing system become evident.

(a) The need to encode grammar rules by combining them into a single parse table is completely eliminated. An inspection of the preferred embodiment of the invention will reveal that all of the data used to parse the sentence came from independent entries in the dictionary. The data that was used to parse the sentence did not come from a source that represented a combination of data. All grammar rules in the form of phrase structure rules and molecular requirements are expressed independently in the dictionary.

(b) Since the grammar rules are expressed independently of each other, the size and complexity of the grammar data grows linearly with the number of rules instead of exponentially. Thus, a large number of grammar rules can be supported without the parser becoming uncontrollably large and complex.

(c) Since the complexity of the parser does not significantly rise with the addition of vocabulary or grammar rules, the parser can accommodate an unrestricted vocabulary and grammar. The prototype parser created using the present invention contained over 20,000 words in its vocabulary and over 600 unique molecular requirements and phrase structure rules.

(d) The molecular parsing process involves very few steps and can be easily implemented on widely available personal computers. The prototype molecular parser was implemented on an IBM compatible personal computer. The total size of the executable program which included dictionary management routines was only 81,000 bytes. The basic parsing routines account for approximately half of the total size.

(e) The molecular parser does not rely on a probabilistic analysis to process natural language. The molecular requirements specify a very precise description of what kinds of words must be found in a sentence and their order in a sentence.

(f) Since the molecular parser does a precise analysis of the sentence structure, it provides an ideal basis for a grammar checking device. The prototype molecular parser provided a 90+ percent accuracy in identifying grammatical sentences.

(g) Since the grammar rules of the molecular parser are expressed independently of each other, new rules can be added and rules can be modified without the fear that other rules will be broken.

(h) The syntax and operation of the molecular parser given in the preferred embodiments were not just a convenient notation to describe the operation. The prototype molecular parser used this syntax exactly. The parser maintained a stack which could be displayed as shown in the example embodiment. By examining this stack structure, grammar problems can be easily diagnosed if they occur.

(i) As shown in the preferred embodiments, a useful semantic representation of a sentence can be directly generated by the molecular parsing process. This can be done in a single step without any analysis of any intermediary sentence/data structures. Another example of this single step process can be observed in the preferred embodiments for subject and verb agreement. The conventional two step process would be to: (1) find the main subject and verb by examining the entire sentence (2) check if the subject and verb agree in person and number. The molecular parser accomplishes this in a single step by transferring the person and number attributes to the verb phrase as soon as the main noun is recognized. When the verb phrase is analyzed, the check to see if the subject and verb agree is done when the verb is identified and an error can be reported immediately. The parser doesn't even have to finish the analysis of the rest of the sentence before reporting an error.

(j) Because the molecular requirements explicitly specify the kinds of words and phrases that must follow a word, the molecular parser can handle undefined words by guessing the type of the word based upon the molecular requirements. For example, if the word "blans" was undefined in the sentence "The boy ate blans.", the requirements for "ate" specify either a noun or prepositional phrase. If it guessed "blans" was a preposition, the parse would fail since a preposition requires another noun phrase. The parser could then backtrack and guess that "blans" was a noun. The parse would succeed in this case. The parser only has to investigate the two possibilities specified by the molecular requirement.

(k) The molecular parser simplifies the task of resolving ambiguity and backtracking. The molecular requirements reduce the number of phrase structure rules that must be searched. For example, to determine if a well formed verb phrase was found in other language systems, a comparison against every known verb phrase structure rule would need to be done. This is computationally expensive and leads to ambiguity. To determine if a well formed verb phrase has been found in the molecular parser, the only rule that has to be searched is the molecular requirement of the verb. Backtracking is also simplified since all of the information on the parse is contained on the stack structure. When an ambiguous word is detected, the stack can be easily duplicated. If backtracking needs to be done, the stack can be easily restored to the ambiguous point and parsing can restart.

(l) Since the molecular requirements specify the kinds of words that must follow a word, this lends itself to predicting the kind of word that must appear based upon the words seen so far.

(m) In the preferred embodiments, the syntax of the molecular requirements was shared by word definitions, phrase rule definitions and by the parser's stack. Since the syntax used by the parser and the data (words/rules) are identical, no processing of the data is needed before a sentence can be parsed. The parser can simply use the data as typed in by the grammar writer. This eliminates any delay between making a change in the data and then testing it.

(n) The syntax of the molecular requirements is compact and easy to understand. In other language systems, phrase structure rules are not expressed with optionality flags. Because of this, they must enumerate every possible combination as a separate rule. For example, a slightly more complex version of a <nounph> could be expressed in a single rule which indicates that a nounph can also have an optional prepositional phrase at the end.

<nounph>——> <adje>—<noun>!<prepph>—

Without optionality flags, it would require four separate rules to express the syntax of a <nounph>. These rules would be:

```
nounph → <adje><noun>
nounph → <noun>
nounph → <adje><noun><prepph>
nounph → <noun><prepph>
```

Thus, the syntax used to express the molecular requirements is easier to understand and is more compact.

SUMMARY, RAMIFICATIONS, AND SCOPE

Accordingly, the reader will see that the molecular language processing system of this invention can be used to precisely analyze natural language sentences without any restrictions in vocabulary and grammar. In addition the language system can be easily implemented on personal computers and is easily modified and maintained. The prototype molecular parser created by the inventor is much more complete that the one shown in the preferred embodiments. There are many refinements which can be made to detect grammar errors, implement backtracking, record semantic information and reduce the processing and memory requirements. For example, attributes which indicate past or future case can be added. Additional steps in the parsing algorithm could then check if the sentence maintained a consistent case. Such steps are usually included after a word has been accepted by the parser. Backtracking can also be enhanced by including conjunctions as a backtracking location. More attributes could be added to indicate the semantic role each token in a molecular requirement can play. An important refinement allows the parser to manage implied elements in a sentence. For example, examine the following sentence:

The car that John likes is blue.

The word "likes" is directly followed by the word "is". This is unusual because the word "likes" can usually only be followed by a noun phrase as in:

John likes the car.

Or, the word "likes" can be followed by an infinitive phrase as in:
John likes to eat.
It would be ungrammatical to follow the word "likes" with a verb phrase as in:
John likes is blue.

The reason why the word "is" can follow the word "likes" in the sentence "The car that John likes is blue" is because this sentence contains the relative clause "that John likes". It is implied that "John likes the car". Yet the words "the car" do not appear after "likes". Relative clauses can always be missing one noun phrase. To handle this situation in the molecular parser, the parser records when it sees a word which introduces a relative clause. Relative clauses are usually introduced with the word "that". If the parser finds that a noun phrase cannot be satisfied in a relative clause, it substitutes the subject of the relative clause for the missing noun phrase. This allows the molecular requirements for the word "likes" to be satisfied in a sentence which contains a relative clause. A similar refinement is used to handle implied elements in question sentences.

Such refinements have enabled the prototype molecular parser to recognize grammatical sentences with a 90+ percent accuracy. On an IBM PC compatible computer, the prototype program only occupies 81,000 bytes. This level of accuracy and compactness is unprecedented. This was accomplished by satisfying the molecular requirements for each word in the language. Other language processing systems lack the concept that each word is an individual which can have specific syntactic and semantic binding requirements which can be directly used to direct the parse of a sentence.

The molecular language processing system solves many of the problems which have thus far prevented the implementation of effective wide-domain natural language applications. Thus, the molecular language processing system represents an enabling technology which can be used to implement any natural language application.

Although the description above contains many specificities, these should not be construed as limiting the scope of the invention but as merely providing illustrations of some of the presently preferred embodiments of this invention. For example, the dictionary entries can be compressed by only providing a pointer to an attribute table. All of the possible attribute combinations could be collected into a table. The dictionary entry would just contain a reference to this table of attributes instead of storing the data directly. Such a table would reduce the amount of memory that the dictionary requires since many words share the same set of attributes. This attributes table would not violate the idea that grammar information must not reside in a single table. The attributes table merely serves as a method to compress the data set and is not directly used by the parsing process. Only the complete word definitions/phrase structure rules would provide information directly to the parsing mechanism. There are many methods available for compressing data sets. Some of these methods may require pre-processing. Thus, some advantages (such as not processing the data before a sentence can be parsed) may be negated by such compression schemes. The syntax and the steps taken to manipulate the parser's stack can also be compressed. Such compression schemes could result in each item on the stack being represented by one or two bytes. The syntax of using brackets "<" ">" and trailing optionality flags could be eliminated in the stack. The use of a stack could also be eliminated. All that is required is a method to verify that the molecular requirements of each word in a sentence are satisfied.

Thus the scope of the invention should be determined by the appended claims and their legal equivalents, rather than by the examples given.

What is claimed is:

1. Apparatus for the analysis of digitally encoded natural language, such apparatus comprising
    means for receiving encoded natural language text for processing,
    dictionary means for storing words of the natural language in which each word in the dictionary can have a rule which specifies the types of words or phrases that can follow each word in the dictionary and their syntax, processing means for analyzing a sentence by verifying that the next word or phrase in a sentence is allowed by the rules contained in the previous words.

2. Apparatus according to claim 1, wherein said dictionary contains data for each word comprised of:
    the word token,
    the semantic and syntactic attributes,
    a rule which expresses the possible syntactic constructions which can follow the word token,
    a pointer to an alternate definition.

3. Apparatus according to claim 1, wherein said dictionary contains data for phrase structure rules comprised of:
    the phrase structure rule token,
    the attributes of words which can start the phrase structure rule,
    the phrase structure rule expansion,
    the inheritor of any attributes.

4. Apparatus according to claim 1, wherein said rules which indicate the types of words and phrases which can follow a word are expressed using a syntax which uses:
    bracket symbols "<" & ">" or other symbols or methods to delineate a token of the rule,
    an exclamation point "!" or other symbol to indicate that the token is a required part of the syntax,
    a slash "/" or other symbol to indicate that either of the tokens which are adjacent to the slash can be used as part of the syntax,
    a dash "—" or other symbol to indicate that the token is an optional part of the syntax,
    a comma "," or other symbol or method to indicate that a token has attached attributes in which the attributes follow the comma.

5. Apparatus according to claim 4, wherein said rule syntax is used to also express the phrase structure rules.

6. A process for the analysis of encoded natural language text comprising the steps of:
    (a) reading information of a digitally encoded text and dividing said text into words which can be sequentially examined, starting with the first word in said text
    (b) placing the phrase structure rule of a sentence for a language on a stack structure
    (c) expanding the phrase structure rule which is on the top of the stack until a token representing a word is reached (d) checking if the said token matches the word in the sentence that is being examined, skipping to step (h) if no match is found
(e) remove said word token from the stack
(f) retrieve from the dictionary entry for said word a rule which specifies the kinds of words and phrases and their syntactic order which can follow said word and place this rule into the top of the stack
(g) get the next word in said sentence as the word to be examined and return to step (c)
(h) checking if said token must match a word in said text and taking an error recovery action if said token must match a word
(i) remove said non-matching token from the stack
(j) terminate processing if the stack is empty or if there are no more words to be examined in the sentence, otherwise returning to step (c).

7. The process of claim 6, further including the step of enforcing agreement among clauses by transferring attributes into the stack structure.

8. The process of claim 6, further including the step of backtracking and restarting processing if an error is detected in step (h) by saving the state of the stack when an ambiguous word is processed and restoring the saved stack when an error is detected in step (h).

* * * * *